United States Patent
Grabb et al.

(10) Patent No.: US 6,437,832 B1
(45) Date of Patent: *Aug. 20, 2002

(54) MITIGATION OF MULTIPATH USING ULTRA WIDEBAND DTV OVERLAY SIGNAL

(75) Inventors: Mark Lewis Grabb, Burnt Hills; John Erik Hershey, Ballston Lake; Kenneth Brakeley Welles, II, Scotia, all of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/422,449

(22) Filed: Oct. 21, 1999

(51) Int. Cl.[7] .......................... H04N 17/00; H04N 5/21
(52) U.S. Cl. ................. 348/614; 348/607; 348/723; 348/729
(58) Field of Search ................. 348/180, 181, 348/607, 608, 611, 614, 723, 725, 729, 618, 735, 192, 193; 375/343, 346, 348, 349, 350; H04N 17/00, 5/21

(56) References Cited

U.S. PATENT DOCUMENTS

| | | | | |
|---|---|---|---|---|
| 4,896,213 A | * | 1/1990 | Kobo et al. | 358/147 |
| 5,316,583 A | * | 5/1994 | Murphy et al. | 370/18 |
| 5,361,102 A | * | 11/1994 | Roy et al. | 348/611 |
| 6,075,823 A | * | 6/2000 | Sonoda | 375/267 |
| 6,122,015 A | * | 9/2000 | Al-Dhahir et al. | 348/614 |
| 6,128,337 A | * | 10/2000 | Schipper et al. | 375/229 |
| 6,304,299 B1 | * | 10/2001 | Frey et al. | 348/614 |
| 6,307,896 B1 | * | 10/2001 | Gumm et al. | 375/316 |

* cited by examiner

Primary Examiner—John Miller
Assistant Examiner—Brian P. Yenke
(74) Attorney, Agent, or Firm—John F. Thompson; Jill M. Breedlove

(57) ABSTRACT

DTV broadcast transmission is provided with a ultra wideband overlay signal which is used by suitably equipped DTV receivers to dynamically estimate the channel and allow expeditious and effective mitigation of changing multipath conditions. Periodic correlation peaks are detected in the received overlay signal, and the timing and magnitude of other peaks in the received overlay signal are used to mitigate multipath in the received signal. A DTV receiver that is not equipped to process the overlay transmission will not be significantly affected by the overlay signal.

11 Claims, 5 Drawing Sheets

MITIGATION OF MULTIPATH USING ULTRA WIDEBAND DTV OVERLAY SIGNAL

CROSS REFERENCE TO RELATED PATENT APPLICATION

This patent application is related in subject matter to patent application Ser. No. 09/201,376 filed Nov. 30, 1998, by M. L. Grabb, N. Al-Dhahir, R. L. Frey, J. E. Hershey, and N. A. VanStralen, for "System and Method for Mitigating Multipath Effects in Television Systems". The disclosure of application Ser. No. 09/201,376 is incorporated herein by reference.

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to digital televison (DTV) and, more particularly, to the provision of an ultra wideband overlay signal in the DTV transmission for mitigation of multipath.

2. Background Art

High definition television (HDTV) is an emerging technology that is capable of providing service either in an analog or digital format. In the United States, research on HDTV has focused on digital, rather than analog, technology. While digital HDTV is not currently available, Japanese companies have developed an HDTV system based on analog technology (known as Hivision) that has been in use since 1991. Because of the potential advantages of digital HDTV and many technical problems shared by both types of systems, research in digital HDTV has also been active in Japan. See, for example, David K. Kahaner in "HDTV Research in Japan", *IEEE Micro*, October 1993, pp. 49–53.

One of the most important prevalent problems in digital television (DTV) is the problem of multipath. In fact, it is useful to think of the DTV channel as multipath limited and not power limited. Multipath may arise from fixed structures acting as reflectors in the transmission channel such as building walls. Moving objects, such as airplanes, may also cause a multipath condition. Even microreflections in cabling can cause multipath. See, for example, P. T. Marhiopoulos and M. Sablatash, "Design of a Ghost Canceling Reference Signal for Television Systems in North America", *Proceedings of Canadian Conference on Electrical and Computer Engineering,* Vancouver, BC, Canada, Sep. 14–17, 1993, pp. 660–663.

The effect of multipath is to create "ghosts" in the displayed TV image. The statistics of multipath ghosts have been studied and compiled by, among others, the BTA (Japan's Broadcasting Technology Association). A BTA survey reported that 92% of ghosts are within a −4 to 26 microsecond range, and when extended to −4 to 37 microseconds, almost all ghost occurrences are covered.

An adaptive equalizer has been proposed to "undo" the effects of the multipath. In its crudest form, an adaptive equalizer functions as a signal processor for estimating the parameters of a hypothetical filter that best describes the channel. The signal processor adjusts the taps of the adaptive equalization filter to approximate an inverse of the hypothetical filter, thus inverting or undoing the effects of the multipath.

The BTA, and other concerns, designed a "ghost canceling reference (CGR)" transmitted signal to mitigate these multipath induced effects. The BTA GCR was found to be less than satisfactory in some instances. While homes with outdoor antennas displayed non-varying (stationary) ghosting conditions which could be largely corrected, those homes with indoor antennas experienced changing (dynamic) ghosts. These dynamic ghosting conditions were more prevalent where people were moving about the room or other moving objects were in the signal path. The BTA ghost canceller generally could not adequately compensate for these conditions. In fact, false ghosts were actually added to an already ghosted picture, leading to reduced picture quality.

Thus, multipath behavior of the DTV channel is important for two different regimes, the outdoor antenna propagation channel and the indoor antenna propagation channel. The former is well-studied and understood. The latter question still presents a problem. The chief difference is the presence of significant reflectors near the indoor receiving antenna, which implies that there will be multipath whose delay occasions it to fall within a symbol period. In order to resolve multipath differences of such limited extent, special techniques must be employed or the channel diagnostic signal must have a very wide effective bandwidth. According to S. Salous in "Indoor and Outdoor UHF Measurements with a 90 MHz Bandwidth", *IEEE Colluquium on Propagation Characteristics and Related System Techniques for Beyond Line-of-Sight Radio,* 1997, pp. 8/1–8/6, the extent of multipath delays in outdoor environments can be a few tens of microseconds, whereas in indoor environments, it is on the order of a few hundred nanoseconds. While multipath components can be adequately resolved with a 10 to 40 MHz bandwidth for outdoor environments, the resolution of multipath for indoor environments requires a 90 to 100 MHz bandwidth.

SUMMARY OF THE INVENTION

Additional "channel information" is provided to a consumer-grade digital television receiver within the context of the adopted ATSC (Advanced Television Standards Committee) standard for digital broadcast. By "channel information" is meant a transfer function effectively describing the relation between the transmitted signal and the received signal. This transformation may be a series of time-delayed and amplitude-attenuated replicas of the same signal, called multipath. However, the transformation may be much more complicated, involving diffraction, refraction, and polarization effects. Using digital signal processing, knowledge of the channel information at the receiver can be exploited to improve the digital television receiver design. Exploitation of the channel information in the receiver design can make the critical difference between being able to receive or not receive a particular digital TV channel in a home. From a broadcaster's perspective, exploitation of the channel information means increased coverage area, hence an increased number of viewers and ultimately increased revenue.

The DTV transmission is thus provided with an ultra wideband overlay signal which is used by suitably equipped DTV receivers to dynamically estimate the channel and allow expeditious and effective mitigation of changing multipath conditions. A DTV receiver not equipped to process the overlay transmission will not be significantly affected by the overlay signal; that is, the invention is backwardly compatible.

The ultra wideband overlay signal is typically on the order of 90 to 100 MHz in bandwidth to enable characterization of the indoor multipath. This ultra wideband overlay signal differs from the wideband overlay signal described in copending patent application Ser. No. 09/201,376 in that it overlaps many other transmission frequencies. This ultra wideband overlay signal is designed in cooperation with other such wideband overlay signals so as to exhibit low cross-correlation with the wideband overlay signal of the invention described in application Ser. No. 09/201,376, which has relatively little power outside of the channel carrying the associated DTV signal. Because of its rate and sequence length, implementation of the ultra wideband overlay signal is built out of a sequence that can be sequentially synchronized, such as Titsworth's component codes or "JPL codes".

DETAILED DESCRIPTION OF THE INVENTION

Overlay signals are well known in the art and have been proposed for a variety of purposes such as providing additional capacity to cellular telephone service as described, for example, by D. L. Schilling, G. R. Lomp and J. Garodnick in "Broadband-CDMA Overlay", *Proceedings of 1993 IEEE Vehicular Technology Conference (VTC)*, pp. 452–455. Another paper by K. G. Filis and S. C. Gupta, "Coexistence of DS CDMA PCN and Analog FM: Performance Degradation of SSSC-FM Channels Due to Spread Spectrum Overlay", *Proceedings of 2nd International Symposium on Personal, Indoor and Mobile Radio Communications,* 1992, pp. 665–669, addresses overlaying a CDMA Personal Communications Network (PCN) on pre-existing narrowband analog FM and Single Sideband Suppressed Carrier (SSSC) Frequency Division Multiplexed (FDM) channels which are corrupted by additive white Gaussian noise. L. B. Milstein and D. L. Schilling in "The CDMA Overlay Concept", *Proceedings of ISSSTA '95 International Symposium on Spread Spectrum Techniques and Applications,* 1996, pp. 476–480, review studies of the coexistence of wideband CDMA (Code Division Multiple Access) waveforms with conventional narrowband signals for enhancing spectral efficiency. Milstein and Schilling comment that the overlay has been demonstrated in both the PCS and cellular bands. They also comment on the apparatus that can be used to successfully accomplish the overlay technique. Another overlay concept is taught in J. E. Hershey et al. U.S. Pat. No. 5,680,143, issued Oct. 21, 1997, which describes a method and apparatus using an overlay of a Gaussian noise signal over a broadband channel which also carries information signals. The purpose of the overlaid Gaussian noise signal is to enable a satellite ranging system to establish the range between a ground station and a spacecraft.

For the present invention, the DTV transmitter overlays an ultra wideband, relatively low power noise-like transmission centered on its associated 8-VSB (vestigial sideband) DTV signal in order to provide a convenient and highly effective way to fine-grain characterize the outdoor and indoor multipath limited channel in order that the multipath effects may be mitigated and the ghosts significantly reduced.

Figure 1:
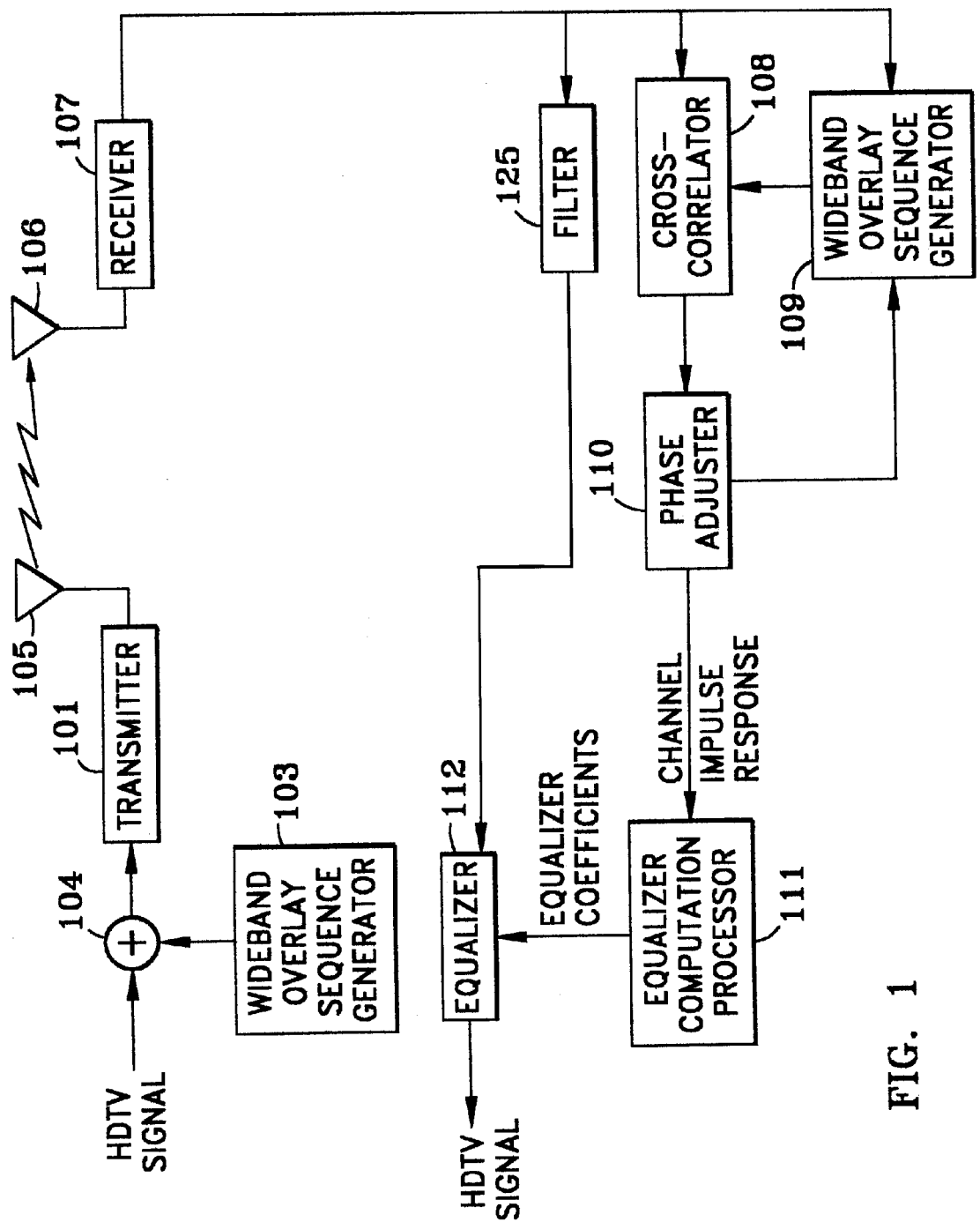
FIG. 1 is a block diagram showing overall operation of one embodiment of the invention.

FIG. 1 shows a transmitter 101 which accepts, from a summer 104, a DTV signal to which an ultra wideband overlay signal produced by a sequence generator 103 has been added in summer 104. The DTV signal with the added overlay signal is converted to a radio frequency (RF) signal and transmitted via a transmitting antenna 105.

Figure 3:
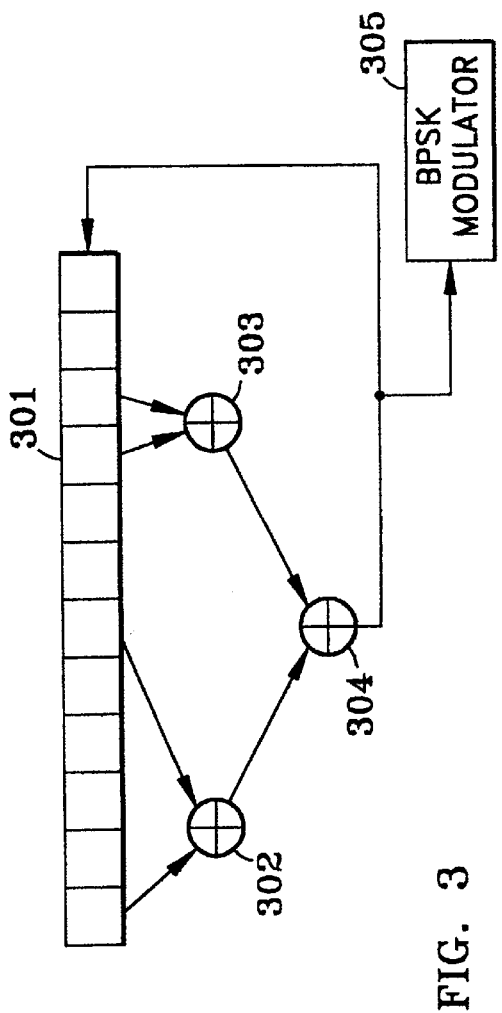
FIG. 3 is a block diagram of a suitable ultra wide-band overlay sequence generator which may be used at both the transmitter and the receiver.

The overlay signal is an ultra wideband signal. The nearer its power spectral density is to flat, or "white", the better the overlay signal will function. The bandwidth of the overlay signal should be as wide as possible. A suitable generator for such an overlay signal is shown in FIG. 3. This is an m-sequence generator of the type described in *Data Transportation and Protection* by John E. Hershey and R. K. Rao Yarlagadda, Chapter 8, pp. 273 to 308 (Plenum Press, 1986).

In the example shown in FIG. 3, a 12-bit shift register 301 in combination with Exclusive OR gates 302, 303 and 304 implement what is known as a "primitive polynomial" which, for the specific example illustrated, is $x^{12}+x^{7}+x^{4}+x^{3}+1$, which provides a cycle of $2^{12}-1=4095$ bits before repeating and a power spectral density similar to that of "white" noise. In addition to functioning to provide shift register feedback, Exclusive OR gate 304 supplies an output signal to a binary phase shift keyed (BPSK) modulator 305, the output signal of which is combined with the DTV signal. In one embodiment of the invention, the ultra wideband overlay signal power is approximately 20–30 dB below the DTV signal power. In this embodiment, the power ratio is approximately −26 dB. This results in minimal, if any, interference to the specific channel of interest and to the other overlaid channels.

Figure 4:
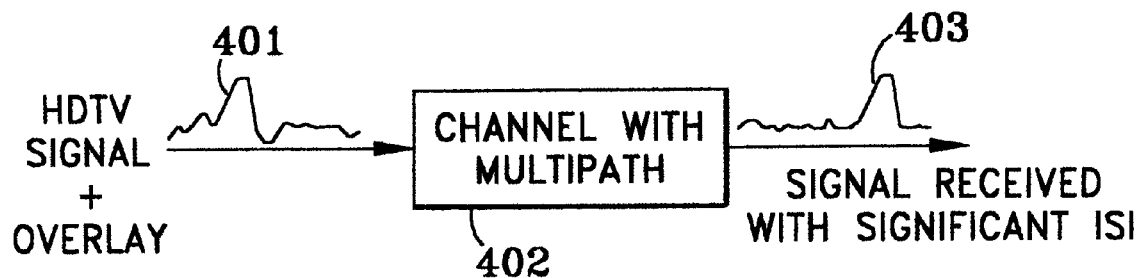
FIG. 4 is a flow diagram illustrating the nature of the transmitted and received signals.

FIG. 4 illustrates what is done by addition of the overlay signal. The DTV signal plus the overlay signal 401 is transmitted through a channel or media with multipath 402. The result is a signal 403 which is received with significant inter- and intra-symbol interference (ISI). The transmitted signal is received by any one of a plurality of receiving antennas and, depending on the location of the receiving antenna and the paths of the transmitted signal, there will be different multipath effects on the received signal.

In the embodiment illustrated in FIG. 1, the transmitted signal is received by a receiving antenna 106 to supply a signal to a receiver 107. Receiver 107 converts the received RF signal to an IF (intermediate frequency) signal which is supplied to a filter 125, a cross-correlator 108 and an ultra wideband overlay sequence generator 109, similar to generator 103 in the transmitter. The filter 125 is a bandpass filter centered on the DTV channel of interest and having a band pass of only 6 MHz so that the other channels, whose spectrum is used by the ultra wideband overlay signal, can be filtered from the channel of interest.

The overlay sequence generator 109 generates a replica of the transmitted ultra wide-band overlay sequence signal, synchronized to the received overlay sequence signal, and provides an output signal to cross-correlator 108. The cross-correlator 108 cross-correlates the received DTV and overlay signals against a locally generated overlay signal from generator 109. The output signal of cross-correlator 108 is fed to a phase adjuster 110 which adjusts the phase of the locally generated overlay signal by retarding or advancing the clocking of the locally generated overlay signal to maximize the largest peak of the signal from cross-correlator 108. Once the phase of the locally generated overlay signal has been properly aligned, the output signal of the cross-correlator yields the impulse response of the multipath channel which is then fed to an equalizer computation processor 111. This processor computes the equalizer coefficients which are applied to the received signal by the channel correction filter, or equalizer, 112. The output signal of equalizer 112 is the desired DTV signal.

Operation of the circuit of FIG. 1 is dynamic; that is, processor 111 dynamically generates filter coefficients for equalizer 112 with changing impulse response corresponding to changing channel conditions.

Figure 5:
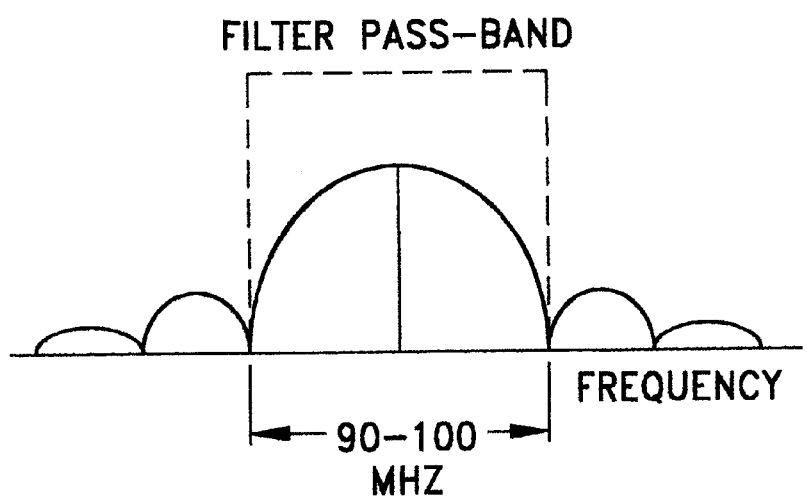
FIG. 5 is a graph illustrating the pass band of the matched filter of the receiver.

In one embodiment of the invention, cross-correlator 108 detects a cross-correlation spike from the cross-correlator every 4095 clock times for the m-sequence generator illustrated in FIG. 3, where a clock time is one clock time for 12-bit shift register 301. This spike of magnitude 4095 is 10 log104095 or about 36 dB above the overlay signal power level and 10 dB above the DTV signal and, therefore, easily detected. Cross-correlator 108 is used to detect other peaks subsequent to this large peak. The presence in time relative to the periodic large peak and the magnitudes of such other peaks describe the multipath situation which can then be provided to equalizer computation processor 111 to adjust the coefficients of equalizer 112 to cancel the multipath. The chip rate of the m-sequence determines the bandwidth of the overlay signal and the resolution of the multipath components. The ultra wideband overlay signal has a bandwidth of between 90 and 100 MHz centered on the channel of interest, as shown in FIG. 5. Therefore, shift register 301 (FIG. 3) needs to have a clock rate of 45 to 50 megabits per second, and cross-correlator 108 needs a pass band to filter minor lobes, as shown in FIG. 5.

Figure 6:
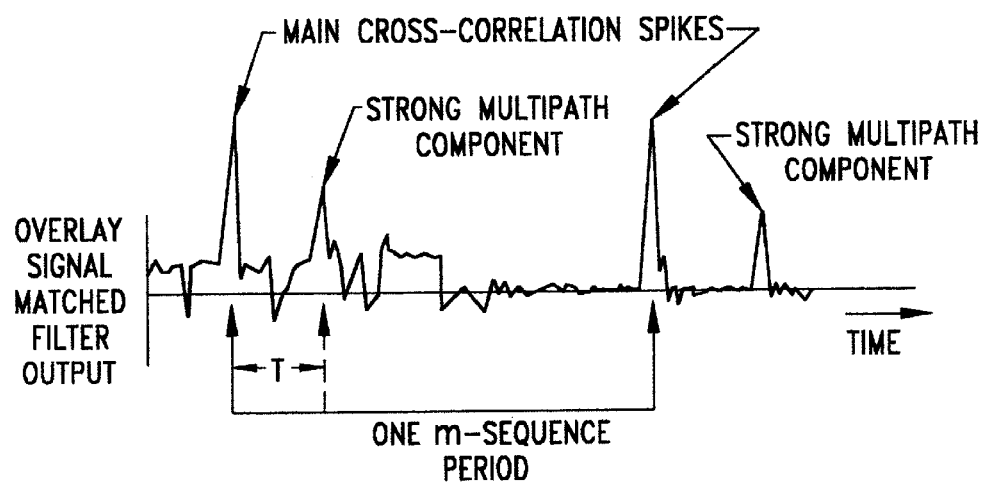
FIG. 6 is a graph showing the multipath component at a delay τ in the output signal of the matched filter.

Cross-correlator 108 thus reports the impulse response of the DTV channel by presenting the multipath components and strengths, as illustrated for example in FIG. 6. The cross-correlator generates an estimate of the impulse response of the multipath, as generally shown in FIG. 6. The estimate provided is a "gross estimate" in that only strong multipath components are detected, but this is generally good enough. The response is dynamic; that is, it changes as the multipath changes.

Figure 2:
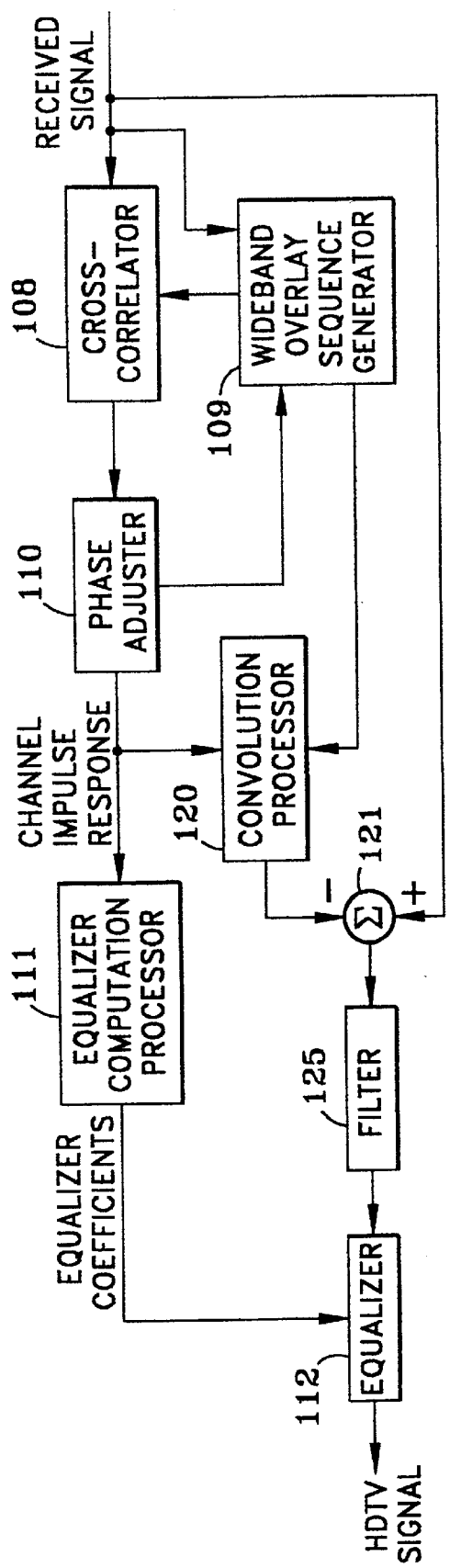
FIG. 2 is a block diagram showing a modification of the circuitry following the receiver shown in FIG. 1 as another embodiment of the invention.

In another embodiment, shown in FIG. 2, in addition to using the overlay signal to estimate the channel response as in the embodiment shown in FIG. 1, the overlay signal and its multipath components are also subtracted out to mitigate their relatively small interfering effects on the received signal. This is done by convolving, in a convolution processor 120, the locally generated and properly time-aligned overlay signal from generator 109 with the estimated channel response from phase adjuster 110. The output signal of convolution processor 120 is then subtracted from the received signal in a summer 121 and filtered in a bandpass filter 125 before the received signal is provided to equalizer 112. Bandpass filter 125 is centered on the DTV channel of interest and has a pass band of only 6 MHz.

As an alternative to the m-sequence generator, there is another embodiment for generating the ultra wideband overlay signal. This alternative embodiment makes use of what is termed a "component" or "JPL" code. The motivation for using such a code is the ease of synchronizing to a much longer sequence and the relatively "rich" space for selecting components of the code. This latter point is highly motivating as there is need to be able to select non-interfering components for overlapping channels.

Component codes are produced by a majority vote function on an odd number of periodic sequences which (i) have relatively prime lengths and (ii) exhibit low cross-correlation. In the single channel m-sequence overlay described in the aforementioned copending application Ser. No. 09/201,376, an m-sequence of length 255 was suggested. In order to create a sequence for the ultra wideband overlay channel which needs to be run at approximately 15 to 17 times the rate of a single channel overlay sequence in order to achieve a spreading of 90 to 100 MHz, it is desirable to keep the sequence repetition rate on the order of the m-sequence repetition rate. Thus, the period of the wideband overlay signal generating sequence should be on the order of 3800 to 4300.

Figure 7:
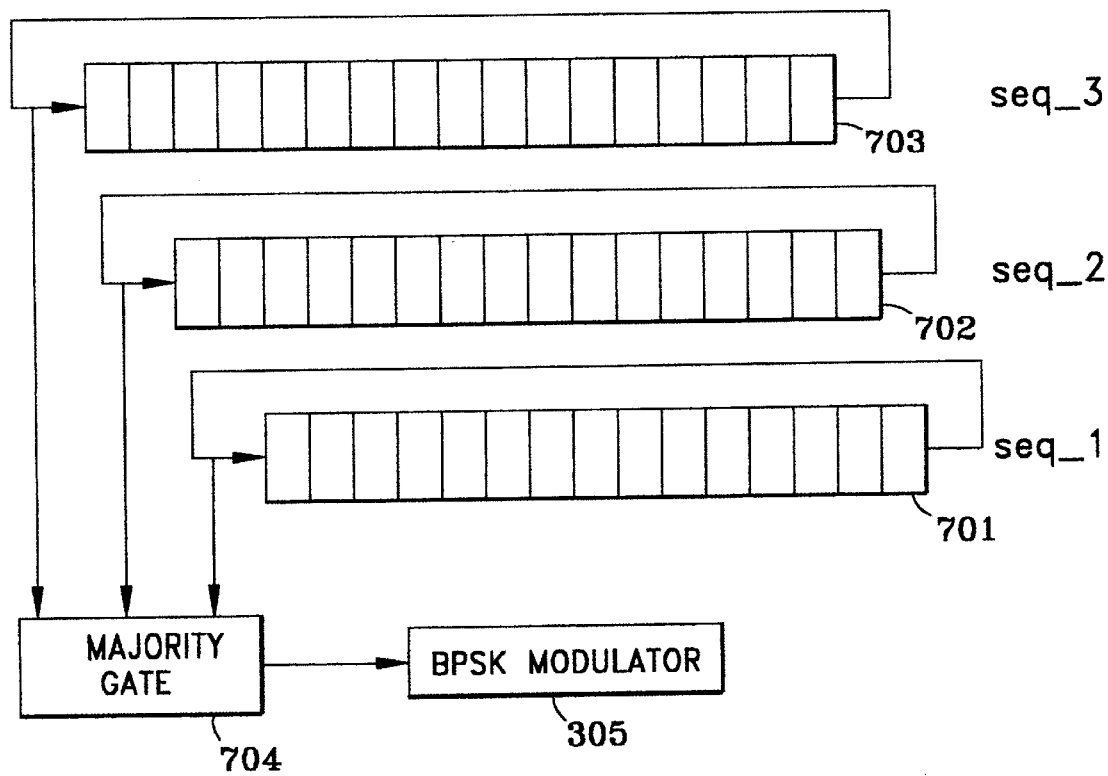
FIG. 7 is a block diagram of an alternate ultra wideband overlay sequence generator which may be used in the practice of the invention.

A viable three component code may be constructed out of three sequences of respective lengths 15, 16 and 17 bits. As an example, FIG. 7 presents such a generator. The sequences, seq_1, seq_2 and seq_3, of respective lengths 15, 16 and 17 bits are as follows:

seq_1: 1,1,−1,−1,1.−1,−1,−1,−1,1,1,1,1,−1,−1
seq_2: −1,−1,1,−1,1,1,1,−1,−1,1,−1,−1,−1,−1,1,1
seq_3: 1,1−1,−1,−1,1,−1,−1,1,1,−1,−1,−1,1,1,1,1,−1.

Thus FIG. 7 shows employment of three end-around shift registers, 701, 702 and 703 of 15, 16 and 17 bits in length, respectively. The bits which are loaded into the left sides of the end-around shift registers are the sequences of ones and minus ones given above. A majority gate 704 is a three-input Boolean logic device that produces a one signal if and only if two or more of its input signals are ones, and produces a minus one signal if and only if two or more of its input signals are minus ones. The output signal of majority gate 704 is the component bits sequence and is sent to BPSK modulator 305 (such as shown in FIG. 3).

Figure 8:
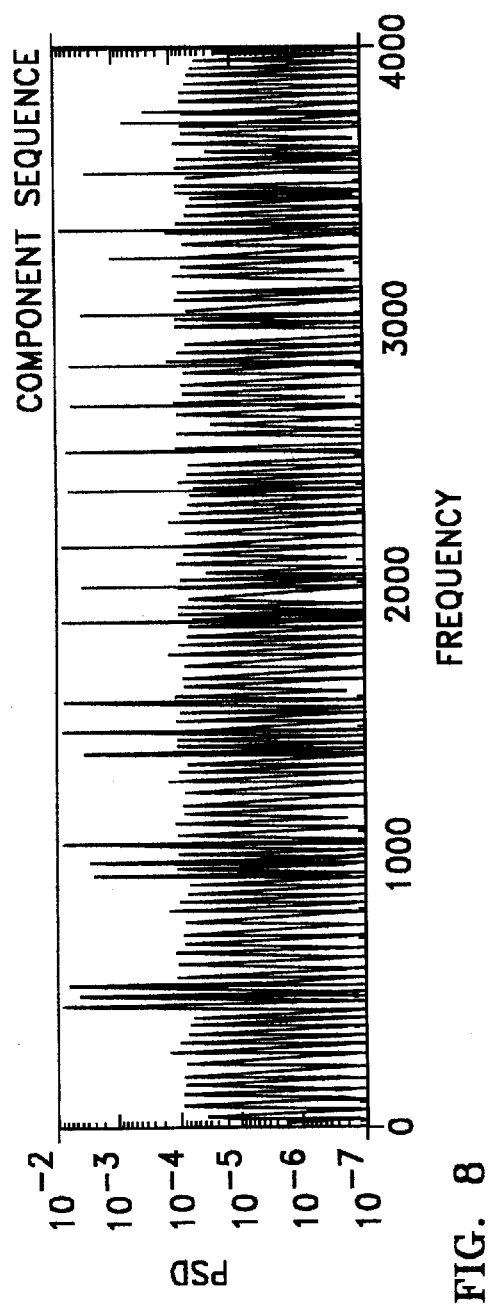
FIGS. 8 and 9 are, respectively, graphs of power spectra of the component sequence generated by the generator of FIG. 8 and an m-sequence of comparable length.
Figure 9:
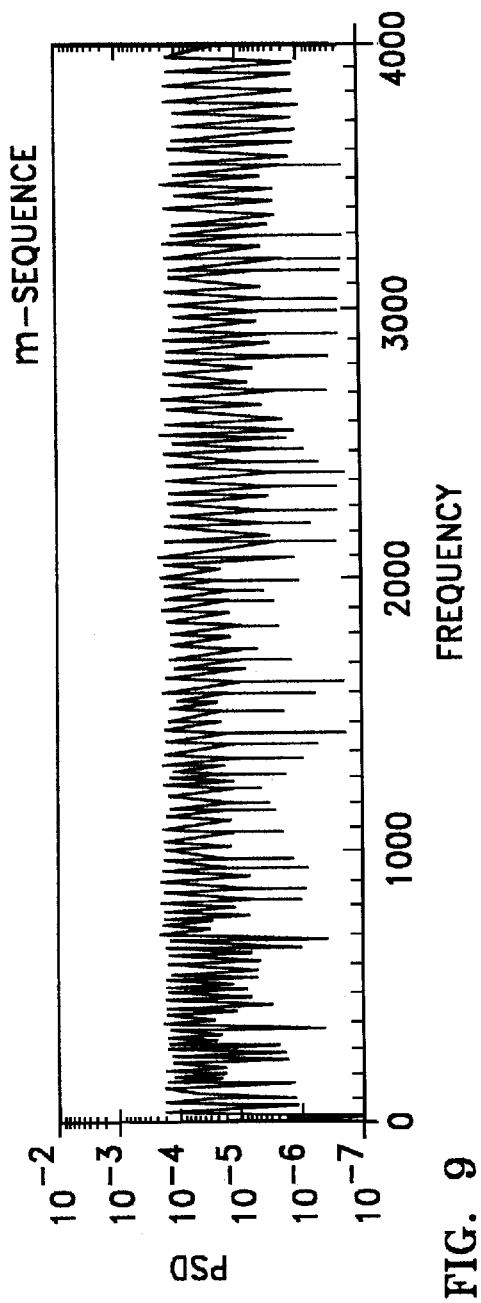

The above component code sequence presented as an example has a period of 15×16×17=4080 bits. The power spectral density of this example component code is shown in FIG. 8, and the power spectral density of an m-sequence of comparable length, i.e., 4095 bits, is shown in FIG. 9. It is apparent that the power spectral density of the component code sequence has peaks, resulting from the periodic short code repetitions within the sequence generator. It is of course necessary to set the overlay power so that the power spectral density peaks do not interfere with the DTV signals. The great advantage of the component code, sequence, however, is that it is easy to synchronize to it. In fact, it is possible to simultaneously synchronize to the component codes, as reviewed in *Data Transportation and Protection* by J. Hershey and R. Yarlagadda, Plenum Press, 1986.

The ultra wideband overlay signal may be analog or digital in form. The specific design of the overlay signal is driven by the following requirements and considerations:

The overlay signal must have an auto-correlation property that will enable a useful characterization of the multipath environment.

The overlay signal should have insignificant cross-correlation with the DTV content-bearing signals.

The overlay signal, its structure and power, must not adversely affect the quality of the DTV product.

The overlay signal must be capable of demodulation and exploitation within a reasonable envelope of complexity and cost.

The overlay signal demodulator must easily interface with other elements in the DTV receiver, such as any at-aperture distributed antenna element controls that may be present.

The overlay signal should be such that backwards compatibility of the DTV transmissions is retained.

The ultra wideband overlay signal must be designed in cooperation with other ultra wideband overlay signals that share a portion of spectrum so as to exhibit low cross-correlation with those other ultra wideband signals.

While various features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method of mitigating multipath in a digital television (DTV) signal comprising the steps of:

adding an ultra wideband overlay signal to an DTV signal at a predetermined power ratio of DTV signal to overlay signal before broadcasting the DTV signal, the ultra wideband overlay signal being centered on a channel of interest and using the spectrum of many adjacent channels;

receiving a transmitted DTV signal;

detecting a periodic correlation peak in the ultra wideband overlay signal;

detecting other peaks in the ultra wideband overlay signal; and using timing and magnitude of the detected other peaks to mitigate multipath in the received signal.

2. The method of mitigating multipath in a DTV signal recited in claim 1, further comprising the step of generating the ultra wideband overlay signal from a sequence generator.

3. The method of mitigating multipath in a DTV signal recited in claim 2, wherein the sequence generator is adapted to generate a sequence that can be sequentially synchronized.

4. The method of mitigating multipath in a DTV signal recited in claim 1, further comprising the step of subtracting the overlay signal and its multipath components from the received signal.

5. A digital television (DTV) system for mitigating multipath in a DTV signal comprising:

a transmitter;

an adder connected to the transmitter for adding an ultra wideband overlay signal to the DTV signal at a predetermined power ratio of DTV signal to overlay signal before providing the DTV signal with the overlay signal to said transmitter for broadcast, the ultra wideband overlay signal being centered on a channel of interest and using the spectrum of a plurality of adjacent channels; and a receiver for receiving the DTV signal with the ultra wideband overlay signal, the receiver comprising:

a detector receiving the DTV signal with the ultra wideband overlay signal and detecting periodic correlation peaks in the ultra wideband overlay signal and other peaks in the ultra wideband overlay signal representing multipath, and an equalizer connected to the detector and responsive to the detector and adapted to use timing and magnitude of detected other peaks to mitigate multipath in the received signal.

6. The DTV system for mitigating multipath in a DTV signal recited in claim 5, further comprising a sequence generator connected to the adder for generating the ultra wideband overlay signal for provision to said adder.

7. The DTV system for mitigating multipath in a DTV signal recited in claim 6, wherein the sequence generator is adapted to generate a sequence that can be sequentially synchronized.

8. The DTV system for mitigating multipath in a DTV signal recited in claim 5, further comprising a summer connected to said receiver for subtracting the overlay signal and its multipath components from the signal received by said receiver.

9. Digital television (DTV) receiving apparatus for mitigating multipath in a DTV signal, comprising:

a receiver receiving a broadcast DTV signal to which has been added an ultra wideband overlay signal at a predetermined power ratio of DTV signal to overlay signal before broadcast, the ultra wideband overlay signal being centered on a channel of interest and using the spectrum of many adjacent channels;

a detector connected to said receiver and detecting periodic correlation peaks in the ultra wideband overlay signal and other peaks in the ultra wideband overlay signal representing multipath; and an equalizer connected to said detector and responsive to said detector and adapted to employ timing and magnitude of detected other peaks to mitigate multipath in the received broadcast signal.

10. The DTV receiving apparatus for mitigating multipath in a DTV signal recited in claim 9, further comprising a summer connected to said receiver for subtracting the overlay signal and its multipath components from the received broadcast signal.

11. A method of mitigating multipath in a digital television (DTV) signal comprising the steps of:

generating an ultra wideband overlay signal from a sequence generator;

adding the ultra wideband overlay signal to an DTV signal at a predetermined power ratio of DTV signal to overlay signal before broadcasting the DTV signal, the ultra wideband overlay signal being centered on a channel of interest and using the spectrum of many adjacent channels;

receiving a transmitted DTV signal;

detecting a periodic correlation peak in the ultra wideband overlay signal;

detecting other peaks in the ultra wideband overlay signal;

using timing and magnitude of the detected other peaks to mitigate multipath in the received signal; and subtracting the ultra wideband overlay signal and its multipath components from the received signal.

* * * * *